United States Patent

Pavlot

[11] 3,900,269
[45] Aug. 19, 1975

[54] CHANNEL JOINT AND JOINER THEREFOR

[75] Inventor: James Pavlot, Pittsburgh, Pa.

[73] Assignee: Midland-Ross Corporation, Cleveland, Ohio

[22] Filed: Nov. 7, 1974

[21] Appl. No.: 521,681

[52] U.S. Cl. .................................. 403/292; 403/363
[51] Int. Cl. .............................................. F16d 1/00
[58] Field of Search ........... 403/363, 292, 295, 7, 8, 403/293, 297, 294, 313, 309, 362, 104; 52/726, 758 F; 242/413; 285/397

[56] References Cited
UNITED STATES PATENTS

| | | |
|---|---|---|
| 749,391 | 1/1904 | Lutz .................................... 403/313 |
| 2,480,260 | 8/1949 | Pittinger ............................ 248/265 |
| 3,222,095 | 12/1965 | Gerus .................................. 403/104 |
| 3,453,011 | 7/1969 | Meinunger .......................... 403/104 |
| 3,671,062 | 6/1972 | Ashworth ............................ 403/292 |

Primary Examiner—Andrew V. Kundrat
Attorney, Agent, or Firm—H. Duane Switzer

[57] ABSTRACT

A channel joiner has a connecting tongue closely receivable in a channel having abutment surfaces on the terminal end portions of the channel sidewalls facing towards the channel bottom wall. A screw has a threaded shank threaded through a threaded hole in the tongue bottom wall and the end of the screw shank bears against the channel bottom wall for biasing the tongue and channel bottom walls away from one another to tightly urge the tongue sidewall edges into firm engagement with the channel abutment surfaces and prevent relative longitudinal movement between the tongue anad channel. The screw has a head located within the tongue between the tongue sidewalls at a location spaced slightly above the tongue bottom wall and substantially below the tongue sidewall edges. A washer having a non-abrasive surface surrounds the screw shank between the screw head and tongue bottom wall for preventing abrasion of wires extending through the tongue and channel by the threads on the screw shank.

8 Claims, 10 Drawing Figures

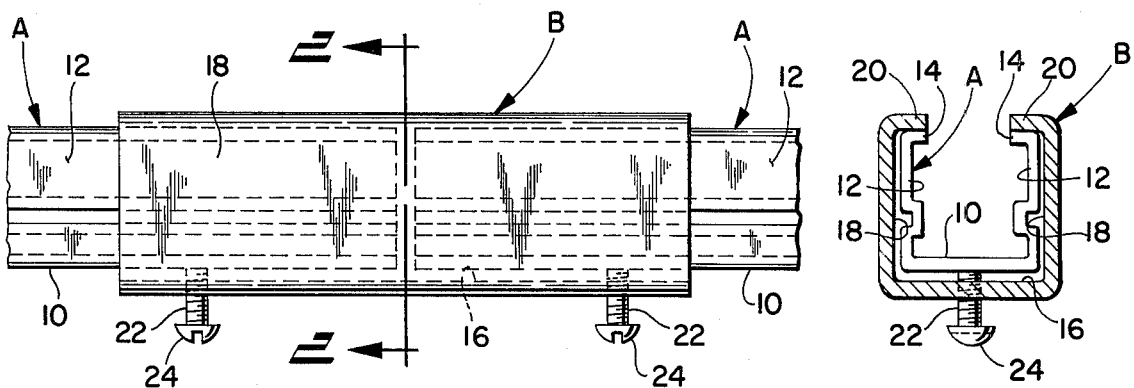
PRIOR ART
Fig. 1
PRIOR ART
Fig. 2
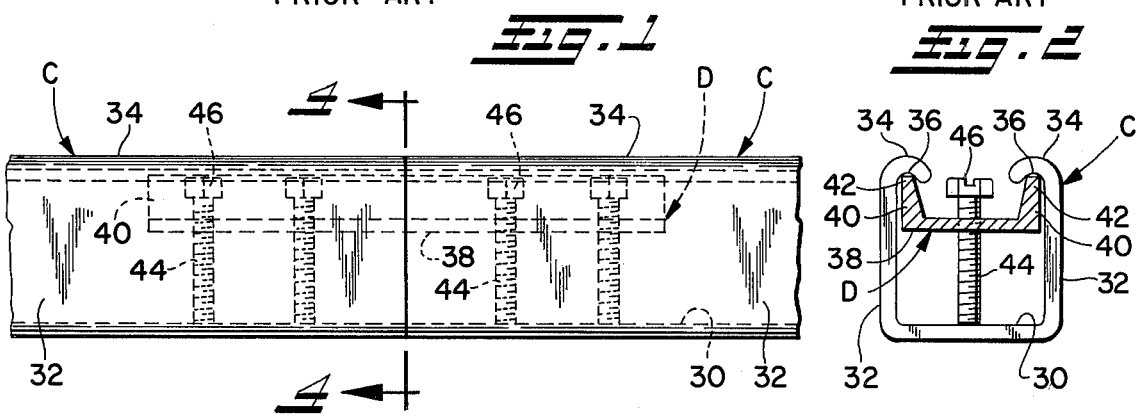
PRIOR ART
Fig. 3
PRIOR ART
Fig. 4
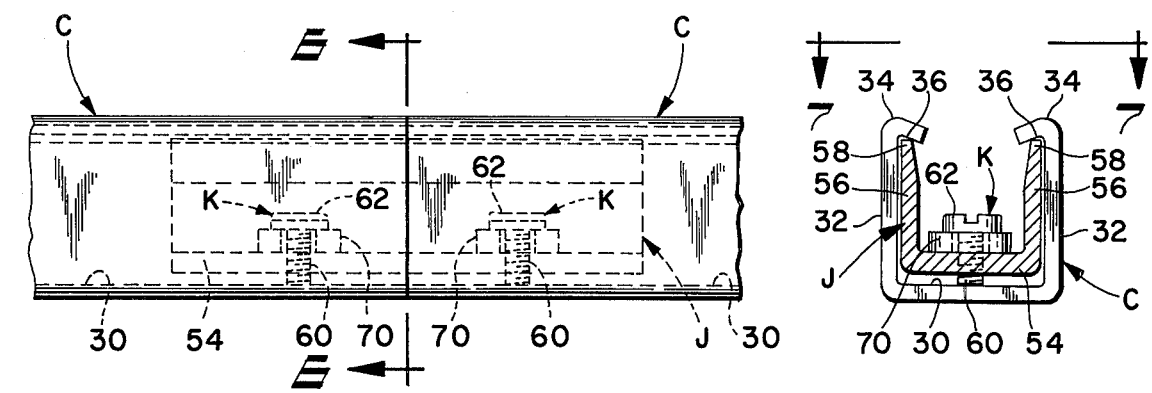
Fig. 5
Fig. 6

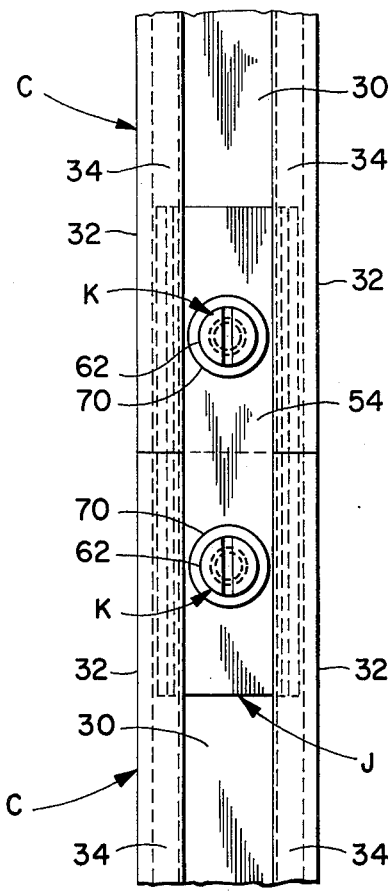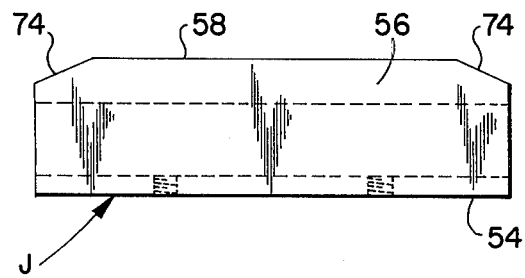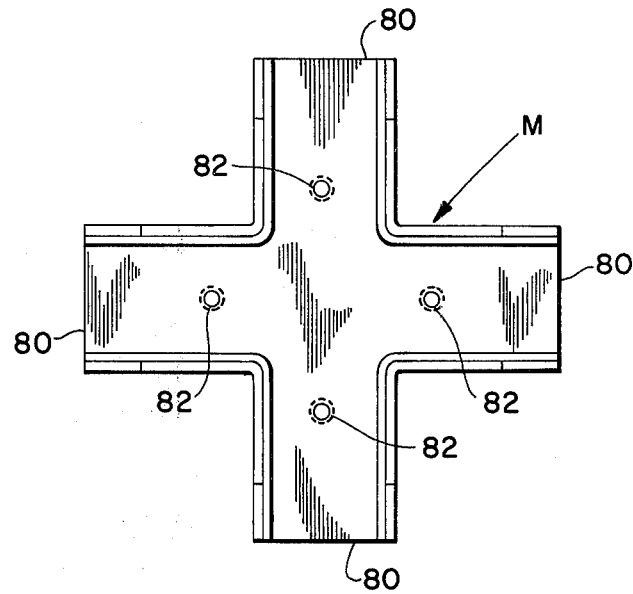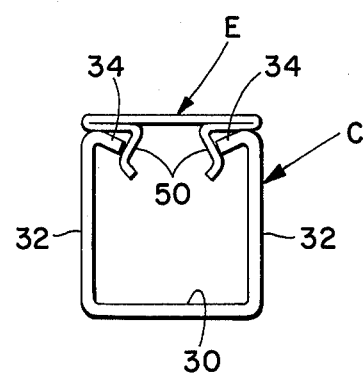

CHANNEL JOINT AND JOINER THEREFOR

BACKGROUND OF THE INVENTION

This application pertains to the art of joints and, more particularly, to joints between generally U-shaped channels.

Channel having a generally U-shaped cross-sectional configuration is commonly suspended from a ceiling or the like for carrying electrical wiring which supplies electrical current to electrical fixtures and machinery. Channel sections must be joined together so the trough in which the wire is positioned will be continuous. The channel is commonly positioned with its top opening facing upwardly so that wire can simply be laid into the trough or conduit defined by the channel.

The joints between adjacent channel sections must be very strong in order that the load rating of the channel itself will not be substantially reduced by weakness of the joints. At the same time, the joints must be easily made so that extensive and time consuming labor will not be necessary. It is also highly desirable that the joints do not materially reduce the interior area of the channel section and thereby materially reduce the amount of wiring which can be positioned in the channel sections. It is also desirable that the joints continue the upwardly facing opening in the channel sections so that wire can be continuously laid into the channel sections and joints without having to snake wire beneath members at the joints. It is also desirable that the joints be made in such a way that abrasion of the wires will be prevented when they are positioned and pulled through the channel sections. It is further important that the joints do not interfere with hanging of the channel sections in the event a hanger has been located where it is necessary to make a joint.

Prior patents related to the subject matter of this application include U.S. Pat. Nos. 898,751 to Krantz and 3,671,062 to Ashworth who disclose channel joints having joiner members positioned within the channels. U.S. Pat. Nos. 1,870,274 to Wulfert and 2,844,233 to Westman disclose joints wherein screws are used for biasing two parts away from one another. Other known prior art is shown in FIGS. 1–4 of the drawing and will be discussed hereafter.

SUMMARY OF THE INVENTION

A joint and joiner for channels having a generally U-shaped cross-sectional configuration including a substantially flat bottom wall and opposite sidewalls having terminal end portions extending toward one another in overlying relationship to such bottom wall for defining abutment surfaces facing toward such bottom wall.

The joiner includes a connecting tongue closely receivable within the channel. Such tongue has a generally U-shaped cross-sectional configuration and includes a substantially flat tongue bottom wall and opposite tongue sidewalls having terminal edges. With the tongue positioned in a channel, biasing means is provided for biasing the bottom walls away from one another to urge the tongue sidewall edges into firm engagement with the abutment surfaces on the channel to prevent relative longitudinal movement between the channel and tongue.

In the preferred arrangement, the biasing means comprises a screw having a threaded shank which is threaded through a hole in the tongue bottom wall. The shank end bears against the channel bottom wall, and the screw has a head spaced slightly above the tongue bottom wall between the tongue sidewalls and substantially below the tongue sidewall edges.

A non-abrasive washer surrounds the screw shank between the screw head and the tongue bottom wall for preventing abrasion of electrical wires extending through the channel and joiner.

The joiner may have two or more connecting tongues so that it is in the shape of a straight joiner member, an L, a T or a cross.

It is a principal object of the present invention to provide an improved channel joint and joiner therefor.

Another object of the invention is to provide a channel joint which is very strong and very easy to assemble by a workman.

A further object of the invention is to provide a channel joint which does not materially reduce the internal cross-sectional area of the channel at the joint.

An additional object of the invention is to provide a channel joint which is internal of the channel so that there is no interference with hanging of the channels when a joint occurs at a location where a channel hanger was previously positioned.

BRIEF DESCRIPTION OF THE DRAWING

FIG. 1 is a side elevational view of a prior art channel joint;

FIG. 2 is a cross-sectional view looking generally in the direction of arrows 2—2 of FIG. 1;

FIG. 3 is a side elevational view of another prior art channel joint;

FIG. 4 is a cross-sectional elevational view looking generally in the direction of arrows 4—4 of FIG. 3;

FIG. 5 is a side elevational view of an improved channel joint constructed in accordance with the present application;

FIG. 6 is a cross-sectional elevational view looking generally in the direction of arrows 6—6 of FIG. 5;

FIG. 7 is a plan view looking generally in the direction of arrows 7—7 of FIG. 6;

FIG. 8 is a side elevational view of a joiner manufactured in accordance with the present application;

FIG. 9 is a plan view of a channel joiner in the form of a cross; and

FIG. 10 is an end elevational view showing a channel having a cover member received in the channel opening.

DESCRIPTION OF A PREFERRED EMBODIMENT

FIG. 1–4 show prior art-type of channel joints and joiners therefor. In FIG. 1, a pair of channels A having their longitudinal axes aligned are connected together by a joiner B. As shown in FIG. 2, each channel A has a generally U-shaped cross-sectional configuration and includes a generally flat bottom wall 10, and parallel spaced-apart sidewalls 12 which terminates at sidewall end portions 14 which extend toward one another in outwardly spaced overlying relationship to channel bottom wall 10. Joiner B also has a generally U-shaped cross-sectional configuration and includes a generally flat bottom wall 16 and spaced-apart generally parallel sidewalls 18 which terminate in end portions 20 extending toward one another in outwardly spaced overlying relationship to bottom wall 16. Joiner bottom wall 16 has suitable threaded holes therethrough for threadably receiving threaded shanks 22 on screws 24. In making a joint, screws 24 are rotated so that the terminal ends of shanks 22 are at least flush with the inner surface of joiner bottom wall 16. End portions of channel A are then positioned within joiner B. Tightening of screws 24 with a screw driver or the like causes the terminal ends of shanks 22 to bear against the outside surfaces of channel bottom wall 10 so that channel bottom wall 10 and joiner bottom wall 16 are forced away from one another, while inturned sidewall terminal portions 14 and 20 are urged into firm engagement with one another for preventing relative longitudinal movement between channel A and joiner B. In an arrangement of this type, a large amount of material is required for joiner B because it is positioned on the outside of channel A. In addition, joiner B requires more material and is more difficult to manufacture because it requires inturned sidewall terminal portions 20 against which inturned sidewall terminal portions 14 on channel A must act to effect a firm joint. Hangers are commonly suspended from a ceiling at predetermined spaced-apart locations for receiving channel A. Having joiner B and screws 24 exteriorly of channel A may interfere with reception of the channel system within a hanger. The necessity of having inturned sidewall terminal portion 20 on joiner B makes it difficult to cast such a joiner where it is desirable that such joiner be L-shaped, T-shaped or cross-shaped.

FIGS. 3 and 4 show a prior art arrangement wherein a pair of channels C are joined by an internally located joiner D. Each channel C has a generally U-shaped cross-sectional configuration and includes a bottom wall 30, and substantially parallel spaced-apart sidewalls 32 having slightly reversely curved sidewall terminal portions 34 which define abutment surfaces 36 facing toward the inner surface of bottom wall 30 in outwardly-spaced relationship thereto. Joiner D also has a generally U-shaped cross-sectional configuration, and includes a bottom wall 38 and opposite stubby sidewalls 40 having terminal sidewall edges 42. Joiner D has suitable threaded holes therethrough for threadably receiving threaded shanks 44 on screws 46. Joiner D is positioned within the end portions of channels C and screws 46 tightened so that engagement of the terminal ends of screw shanks 44 against the inside surfaces of bottom wall 30 on channels C will bias bottom walls 30 and 38 away from one another to firmly urge sidewall terminal edges 42 into engagement with abutment surfaces 36. In the arrangement of FIGS. 3 and 4, sidewalls 40 have a height which is substantially less than the height of channel sidewalls 32. Therefore, when it is desirable to extend wires through channels C past joiner D, it is necessary to snake such wires between bottom walls 30 and 38. In addition, the sharp threads on screw shanks 44 are exposed to the wire and may cut or abrade the insulation on such wires as the wires are pulled past the joint. Once wires are positioned within channels C, the opening in such channels is usually closed by a closure strip as shown at E in FIG. 10. Such closure strip E may be made of metal or synthetic plastic material and includes depending reversely curved legs 50 which are spaced-apart in their relaxed condition a distance slightly greater than the distance between the terminal ends of sidewall curved portions 34. Closure strip E is applied to the channel openings by forcing legs 50 between the terminal ends of sidewall curved portions 34 so that legs 50 resiliently grip against the terminal ends of sidewall curved portions 34. In the arrangement of FIGS. 3 and 4, the use of a joiner D having extremely stubby sidewalls 40 interferes with application of legs 50 between the terminal ends of sidewall curved portions 34. In addition, the heads of screws 46 are often located in a position where they interfere with proper positioning of closure strip E.

In accordance with the present application, channels C are joined by an improved joiner J constructed in accordance with the present invention. FIGS. 5–8 show a straight through connector J for connecting a pair of channels C having their longitudinal axes aligned. Such joiner J has a substantially uniform cross-sectional shape throughout its length and the opposite end portions of such connector may be considered as connecting tongues which are receivable in the open end portions of channels C. Such connecting tongues have a generally U-shaped cross-sectional configuration, and include a bottom wall 54 and substantially parallel spaced-apart sidewalls 56 which terminate at sidewall edges 58. Joiner J is dimensioned and shaped to be a relatively snug fit within channel C. Joiner sidewalls 56 have a height which is only slightly less than the distance between abutment surfaces 36 and the inner surface of channel bottom wall 30. In a preferred arrangement, the height of joiner sidewalls 56 is such that the spacing between the inner surface of channel bottom wall 30 and the outer surface of joiner bottom wall 54 will not be greater than approximately ⅛ inch when terminal edges 58 are urged into firm engagement with abutment surfaces 36.

Bottom wall 54 has suitable threaded holes therethrough threadably receiving threaded screw shanks 60 on screws K having enlarged screw heads 62. It has been found highly desirable to employ screws K having heads 62 which are flat and substantially larger than the diameter of shanks 60 so that a large slot can be formed therein for reception of a large screw driver bit to which considerable torque can be applied for tightening screws K.

For making a joint, joiner J, or the opposite end portions thereof which define the connecting tongues, are snuggly received within the end portions of channels C. Screws K are then tightened so that the terminal ends of screw shanks 60 bear against the inner surface of channel bottom wall 30 for biasing bottom wall 54 away therefrom and tightly urging sidewall terminal edges 58 into firm engagement with abutment surfaces 36. This effects an extremely strong joint for preventing longitudinal movement between channels C and joiner J, and also provides a very high strength joint which resists bending deformation.

As shown in FIG. 6, the length of the screws are such that the screw heads 62 are located within joiner J between joiner sidewalls 56, and spaced slightly above the inner surface of joiner bottom wall 54 and substantially below sidewall terminal edges 58 so as to be situated between the bottom wall 54 and a plane bisecting the height of the sidewalls 56 when the terminal edges 58 engage surfaces 36. The arrangement described minimizes the reduction in internal area of channels C so that there is no problem in having to snake wires past the joint or in having the joint hold substantially less wires than the channels.

In accordance with an important aspect of the invention, non-abrasive washers 70 are positioned around screw shanks 60 between the interior surface of joiner bottom wall 54 and the flat undersurface of screw heads 62. Such washers 70 preferably have a diameter greater than the diameter of screw heads 62 so that wires cannot engage the relatively sharp outer edge of the undersurface of heads 62. In one arrangement, washer 70 may be made of leather or other compressible material such as rubber, paper or plastic. However, such washers 70 may also be made of relatively incompressible material as long as the outer surface thereof is very smooth to prevent abrasion of the insulation on wires positioned within the channels and joints. Where the washers are not compressible, they preferably have a thickness such that a slight space remains between the screw head undersurface and the outer surface of the washers so that full tightening of the screws is possible to make firm engagement between sidewall terminal edges 58 and abutment surfaces 36. However, such space between the washer upper surface and the undersurface of the screw head is preferably extremely small so that wires located within channel C cannot fit between such space where they could be abraded by the sharp threads on screw shanks 60 or by the relatively sharp outer periphery of the screw head undersurface.

In a preferred arrangement, as shown in FIG. 8, the opposite ends of joiner J, or what may be described as the connecting tongues thereof, are provided with sloping surfaces 74 on sidewalls 56. In other words, sloping surfaces 74 slope downwardly toward bottom wall 54 and toward the terminal ends of joiner J or the connecting tongues. Such sloping surfaces reduce the height of sidewall 56 at the terminal ends of the connecting tongues to simplify insertion of such tongues within the open end portions of channels C. Screws K are preferably located a substantial distance inwardly toward the center of the joiner from where sloping surfaces 74 intersect sidewall terminal edges 58 so that tightening movement of screws K will firmly engage sidewall terminal edges 58 with abutment surfaces 36 and no cocking of the joiner will occur.

FIG. 9 shows a joiner M in the form of a cross. Such joiner M has four connecting tongues generally indicated by numeral 80, and such tongues have the same shape and size as that described with respect to joiner J. By omitting one such connecting tongue 80 in FIG. 9, the joiner would be substantially T-shaped. By omitting two of such connecting tongues, the joiner would be generally L-shaped. The threaded holes through the bottom walls of the connecting tongues are generally indicated by numeral 82 in FIG. 9.

In the arrangement described with respect to FIGS. 6–9, the joiner has substantial strength in bending due to its high section modulus provided by the relatively large height of joiner sidewalls 56 as compared to the joiner of FIGS. 3 and 4 where the stubby sidewalls provide a low section modulus.

The improved channel joint and joiner of the present application makes it possible to assemble the channels in their desired manner while leaving a top opening into the channels even at the joints so that wires can simply be laid into such channels. The advantageous arrangement of providing non-abrasive washers 70 surrounding the threaded screw shanks between the screw heads and the inner surface of the joiner bottom wall provides an acceptable internal joint without danger of cutting or abrading the insulation on the wires.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

I claim:

1. A joint between a channel and a joiner, said channel having a generally U-shaped cross-sectional configuration and including a substantially flat bottom wall and opposite sidewalls having terminal end portions extending toward one another in overlying relationship to said bottom wall to define abutment surfaces facing toward said bottom wall, said joiner including a connecting tongue having a generally U-shaped cross-sectional configuration and including a substantially flat bottom wall and opposite sidewalls terminating in sidewall edges, said tongue being dimensioned for closely fitting within said channel with said tongue bottom wall closely adjacent said channel bottom wall, said tongue sidewalls having a height extending a major portion of the height of said channel sidewalls, and threaded biasing means including a head at one end for biasing said bottom walls away from one another to tightly urge said terminal edges of said tongue sidewalls against said abutment surfaces and hold said tongue and channel against longitudinal movement relative to one another; and the threaded biasing means having a length locating said head between the flat bottom wall of the tongue and a plane bisecting the height of said tongue sidewalls when said terminal edges are in engagement with said abutment surfaces.

2. The joint of claim 1 wherein said tongue has a terminal end and said terminal edges of said tongue sidewalls have terminal portions sloping downwardly toward said tongue bottom wall at said terminal end.

3. The joint of claim 1 wherein said threaded biasing means comprises screw having a threaded shank threaded into a threaded hole through said tongue bottom wall and a screw end bearing against said channel bottom wall, said screw having a head within said tongue between said tongue sidewalls, said screw head being spaced slightly above said tongue bottom wall and substantially below said tongue sidewall terminal edges, and a non-abrasive washer surrounding said screw shank between said screw head and said tongue bottom wall.

4. A channel joiner having a generally U-shaped cross-sectional shape and including a substantially flat bottom wall and opposite sidewalls having sidewall terminal edges, threaded holes through said bottom wall, screws having threaded shanks threaded into said holes and screw heads spaced slightly above said bottom wall between said sidewalls well below said sidewall terminal edges, and non-abrasive washers surrounding said shanks between said bottom wall and said heads.

5. The joiner of claim 4 wherein said washers are of non-metallic flexible material.

6. The joiner of claim 4 wherein said joiner has terminal ends and said joiner sidewall terminal edges have sloping end portions which slope downwardly toward said bottom wall adjacent said terminal ends, said threaded holes being located inwardly from said terminal ends a substantial distance from the intersections between said sloping end portions and said sidewall terminal edges.

7. The joiner of claim 4 wherein said screw heads have a substantially larger diameter than said shanks and said washers have a diameter at least as great as said heads.

8. The joiner of claim 7 wherein said washers are of non-metallic compressible material.

* * * * *